United States Patent
Schmit et al.

(10) Patent No.: US 10,633,199 B2
(45) Date of Patent: Apr. 28, 2020

(54) ENHANCED PRESSURISING OF BULK MATERIAL IN LOCK HOPPERS

(71) Applicant: PAUL WURTH S.A., Luxembourg (LU)

(72) Inventors: Louis Schmit, Luxembourg (LU); Ben Muller, Wecker (LU)

(73) Assignee: PAUL WURTH S.A., Luxembourg (LU)

( * ) Notice: Subject to any disclaimer, the term of this patent is extended or adjusted under 35 U.S.C. 154(b) by 0 days.

(21) Appl. No.: 15/756,967

(22) PCT Filed: Aug. 1, 2016

(86) PCT No.: PCT/EP2016/068265
§ 371 (c)(1),
(2) Date: Mar. 1, 2018

(87) PCT Pub. No.: WO2017/036694
PCT Pub. Date: Mar. 9, 2017

(65) Prior Publication Data
US 2018/0251322 A1     Sep. 6, 2018

(30) Foreign Application Priority Data
Sep. 2, 2015 (LU) .......................................... 92813

(51) Int. Cl.
*B65G 53/66* (2006.01)
*B65G 53/22* (2006.01)

(52) U.S. Cl.
CPC ............. *B65G 53/22* (2013.01); *B65G 53/66* (2013.01)

(58) Field of Classification Search
CPC .... B65G 53/22; B65G 53/66; B65G 2812/16; B65G 2812/1641; B65G 2812/165; B65G 2812/1658
(Continued)

(56) References Cited

U.S. PATENT DOCUMENTS 2,771,323 A * 11/1956 Taylor ...................... B01J 8/082
                                                                        406/14
2,873,145 A * 2/1959 Moser, Jr. ................ B01J 8/388
                                                                          406/14
(Continued)

FOREIGN PATENT DOCUMENTS

| EP | 0653366 A2 | 5/1995 |
| WO | 2004106199 A1 | 12/2004 |
| WO | 2014006073 A1 | 1/2014 |

OTHER PUBLICATIONS

International Search Report dated Oct. 6, 2016 re: Application No. PCT/EP2016/068265; pp. 1-4; citing: WO 2004/106199 A1, EP 0 653 366 A2, EP 2 870 424 A1, U.S. Pat. No. 4,014,577 A and US 2006/056924 A1.
(Continued)

*Primary Examiner* — Joseph A Dillon, Jr.
(74) *Attorney, Agent, or Firm* — Cantor Colburn LLP

(57) ABSTRACT

A process for pressurizing bulk material in an apparatus for pressurizing bulk material in a hopper; wherein the hopper is configured as a lock hopper containing a bulk material, wherein the apparatus comprises a source of pressurized gas, lines to convey the pressurized gas from the source of pressurized gas to one or more inlets of the lock hopper, a valve arrangement arranged in the lines, wherein the process is characterized in that said valve arrangement comprises at least two valves arranged in parallel, each valve being connected to a downstream Laval tuyere, and in that said valves are controlled to open in an operating sequence to provide pressurizing gas with an adjusted gas flow rate to the lock hopper.

6 Claims, 1 Drawing Sheet

(58) Field of Classification Search
USPC .. 406/14, 15, 16, 17, 18, 136, 137, 138, 94, 406/95
See application file for complete search history.

(56) References Cited

U.S. PATENT DOCUMENTS

| | | | | |
|---|---|---|---|---|
| 2,919,159 | A * | 12/1959 | Lacroix | B65G 53/00 406/137 |
| 4,014,577 | A | 3/1977 | Clency et al. | |
| 4,369,060 | A * | 1/1983 | Metz | C22B 9/05 266/218 |
| 4,415,358 | A * | 11/1983 | Metz | C21C 7/064 75/382 |
| 4,483,646 | A * | 11/1984 | Moriyama | B65G 53/66 406/123 |
| 4,599,017 | A * | 7/1986 | Russemeyer | B65G 53/525 406/156 |
| 4,715,749 | A * | 12/1987 | Hoppe | B65G 53/521 406/14 |
| 5,265,983 | A | 11/1993 | Wennerstrom et al. | |
| 5,269,635 | A * | 12/1993 | Taylor, Jr. | B65G 53/66 37/309 |
| 5,775,851 | A * | 7/1998 | Waeschle | B65G 53/521 406/14 |
| 6,447,215 | B1 * | 9/2002 | Wellmar | B65G 53/66 406/11 |
| 6,478,846 | B1 * | 11/2002 | Schmit | C21B 5/003 266/182 |
| 6,786,681 | B2 * | 9/2004 | Grasshoff | B65G 53/28 406/11 |
| 8,858,123 | B2 * | 10/2014 | Schmit | F23K 3/02 110/105 |
| 10,150,925 | B2 * | 12/2018 | Schmit | B65G 53/12 |
| 2006/0056924 | A1 | 3/2006 | Jurkovich | |
| 2011/0232547 | A1 * | 9/2011 | Schmit | F23K 3/02 110/263 |
| 2017/0283720 | A1 * | 10/2017 | Schmit | B65G 53/12 |
| 2019/0001339 | A1 * | 1/2019 | Schmit | B02C 21/00 |

OTHER PUBLICATIONS

Written Opinion dated Oct. 6, 2016 re: Application No. PCT/EP2016/068265; pp. 1-5; citing: WO 2004/106199 A1, EP 0 653 366 A2, EP 2 870 424 A1, U.S. Pat. No. 4,014,577 A and US 2006/056924 A1.

* cited by examiner

ENHANCED PRESSURISING OF BULK MATERIAL IN LOCK HOPPERS

TECHNICAL FIELD

The present disclosure generally relates to transporting bulk solid material, over larger distances, such as in so-called dense phase conveying, and/or against a considerable back-pressure.

BACKGROUND ART

In upstream pneumatic conveying lines transporting bulk solid material, especially pulverized material, over larger distances, particularly in so-called dense phase conveying, and/or against a considerable back-pressure at the outlet of the conveying line(s), the overpressure required in order to feed the bulk material into the line(s) may be significant.

In these circumstances, the inward transfer of the bulk material is commonly performed by means of hoppers designed as pressure vessels and usually called conveying hoppers, feed hoppers, blow tanks, etc. In the frequent cases where a continuous supply of bulk material to the downstream consumer is requested, at least two of those hoppers are provided, either in a serial arrangement or in a parallel arrangement.

In case of a serial arrangement, the first hopper is operated as a lock hopper, being cyclically filled from an upstream storage bin or similar, pressurized, emptied into the second hopper and finally depressurized or vented, whereas the second hopper is constantly maintained in overpressure conditions and continuously feeds the pressurized bulk material into the conveying line(s).

In case of a parallel arrangement, both hoppers are operated as lock hoppers in a "staggered parallel mode", i.e. are both cyclically filled, pressurized, emptied and depressurized, and alternately feed the pressurized bulk material into the conveying line(s), in such a way as to have a continuous supply of pressurized bulk material into this/these conveying line(s).

A typical example of lock hoppers operated as inward transfer equipment may be found in so-called Pulverized Coal Injection (PCI) Plants, supplying pulverized coal to blast furnaces. In those plants, operating overpressure levels of the hoppers in the range of about 5 bar g up to 20 bar g are common. Operating pressure levels of up to 30 bar g and more may be required e.g. in equipment feeding pulverized coal into coal gasifiers.

As described above, lock hoppers are thus operated batch-wise or discontinuously by alternative cycles of filling in bulk material while the lock hopper is depressurized, closing and pressurizing the hopper and opening the hopper's outlet to convey the bulk material into the pressurized conveying lines or, in the case of the above-mentioned serial arrangement into a second hopper constantly under pressure. Lock hoppers are thus very different from continuously operated so-called blow bottles, such as those described in U.S. Pat. No. 5,265,983. Indeed, such blow bottles being constantly operated under pressure require complex feeding devices often consisting of a cascade of pressure resistant feeding units with transitional zones under increasing pressure. Especially for systems operating at high pressures such blow bottles are either not usable at all or become too complex and unreliable.

Pressurizing of the bulk material inside the lock hopper is performed by injecting pressurized process gas into the bulk material. In case the bulk material is combustible, e.g. in case of pulverized coal, the process gas is usually inert (has a reduced content of oxygen) in order to prevent fire and explosion. Compressed nitrogen is commonly used in such cases. The amount of process gas needed to pressurize the bulk material inside the hopper is conditioned by the inner volume of the hopper, the overpressure level to be achieved, the filling level of the bulk material and the void fraction of the bulk material (ratio of void volume to total volume). Void fraction of bulk material can be large, 60% and more, so that a completely filled hopper may require an amount of pressurizing gas in the order of magnitude of an empty hopper.

Process gas for pressurizing each lock hopper is supplied through a pressurizing gas branch, connecting the process gas supply main of the inward transfer sub-plant to the lock hopper to be pressurized. In order to shorten the hopper cycle time and thus the required capacity and inner volume of this lock hopper, while avoiding peaks in process gas demand on supply main level, the process gas may be accumulated in a buffer vessel for pressurizing gas. The buffer vessel is continuously filled with pressurizing gas supplied from the supply main at a reduced flow rate, and then periodically, each time a lock hopper is to be pressurized, emptied at a large flow rate into the lock hopper. Depending on the pressure level of process gas supply and the operating pressure level in the lock hopper, it may make sense to install two buffer vessels instead of one, performing pressurizing of the lock hopper at a large flow rate in two stages, and only partly pressurize the lock hopper with pressurizing gas accumulated in the buffer vessel(s), while the complementary amount of pressurizing gas is directly supplied from the process gas supply main to the lock hopper.

An important aspect of such installations is that the initial difference in gas pressure between the process gas supply main or the buffer vessel and the lock hopper is generally so high that it would lead to initially very huge gas velocities leading to compacting the bulk material inside the lock hopper, thereby reducing its flowability and thus preventing the subsequent emptying of the hopper. So, although the time needed to pressurize the lock hopper should be kept as short as possible in order not to be a limiting factor in the downstream process in common plants, the initial flow rates in the pressurizing gas branches are generally limited.

A non-expensive and thus commonly used way to limit pressurizing gas flow rates is to fit the related pipeline with a Laval tuyere. While only producing a limit pressure loss, a Laval tuyere limits the gas mass flow rate to values strictly proportional to the gas absolute pressure upstream the tuyere. Which means that the pressurizing gas flow rate supplied from the process gas supply main through the branch into the lock hopper is constant, provided the gas pressure level in this main is constant, and that the pressurizing gas flow supplied from the buffer vessel is decreasing over time as the pressure level in that vessel is decreasing.

The main disadvantages of existing/conventional installations remain the too long duration needed for fully pressurizing bulk material in the lock hopper, the dimensioning of certain parts of the equipment to cope with initial pressurizing conditions and/or the noise nuisance during the process.

BRIEF SUMMARY

The disclosure provides an alternative and enhanced way for pressurizing bulk material in so-called lock hoppers, which process allows reducing the pressurizing time needed, resolving the above-mentioned dimensioning issue of the equipment and/or alleviating noise nuisances compared to existing processes and installations.

In order to overcome the above-mentioned problem, the present disclosure proposes, in a first aspect, a process for pressurizing bulk material in an apparatus for pressurizing bulk material in a hopper; wherein the hopper is configured as a lock hopper containing a bulk material. The apparatus comprises a source of pressurized gas, lines to convey the pressurized gas from the source of pressurized gas to one or more inlets of the lock hopper, and a valve arrangement arranged in the line(s). The process of the disclosure provides that said valve arrangement comprises at least two valves arranged in parallel, each valve being connected to a downstream Laval tuyere. In other words, in the present disclosure, within the valve arrangement, each valve is connected to its Laval tuyere and the at least two combinations of a valve and a Laval tuyere are arranged in parallel. Furthermore, in processes of the disclosure, said valves in the valve arrangement are controlled to open (and preferably optionally to close) in an operating sequence to provide pressurizing gas with an adjusted gas flow rate to the one or more inlets of the lock hopper.

Indeed, it has been found that by controlling the gas flow rate with such a controllable valve arrangement, different advantages may be obtained. Compared to conventional apparatuses with only one valve with associated Laval tuyere, the time for full pressurizing of a lock hopper can be significantly reduced. Indeed, with the present process operated with said operating sequence of opening first one of the valves, then after a time a second, etc., the duration of the pressurizing can be shortened by up to about 60% (arrangement of two parallel valves) or even by up to about 70% (arrangement of three parallel valves) in common installations (see details below). In this context it is noteworthy that this increase in pressurizing speed is obtained with installations having similarly dimensioned components (especially sintered metal discs) as conventional ones. Furthermore, this increased speed is obtained without increasing the risk of undesirable compacting of the material inside the lock hopper.

In the process as described herein the opening of the at least two valves in the operating sequence may be controlled based on a prefixed timed sequenced. In preferred embodiments, the opening of the at least two valves in the operating sequence may be controlled based on the actual gas flow rate of the pressurizing gas measured downstream the valve arrangement using any appropriate means, such as a gas volume flow rate or velocity measurement device and/or on the gas flow rate of the pressurizing gas calculated based on actual upstream and downstream pressures measured using a pressure sensing device during the pressurizing.

Alternatively or additionally the operating sequence of the valves may also be controlled based on the flow rate of the pressurizing gas calculated based on actual upstream and downstream pressures measured using appropriate conventional pressure sensing devices during the pressurizing.

In fact, the present process allows for pressurizing bulk material in a hopper in a reduced time by allowing controlling the actual gas flow rate to rates more or less approaching constant volume flow rates by using devices known to only provide constant mass flow rates. Although only two valves in the valve arrangement seem a priori not to provide much tuning, even such a reduced number provides a surprisingly huge reduction in pressurizing time. Moreover, even with such a reduced number of valves with associated Laval tuyere, a surprising increase in fine tuning may be achieved by appropriately choosing components.

Hence, in particularly preferred variants of the process, the different Laval tuyeres in the valve arrangement have different inner cross-sections. In such cases, the operating sequence allows for even further adjusting the actual gas flow rate of the pressurizing gas (to come even closer to constant volume flow rates during a larger time fraction of the pressurizing cycle) by selectively opening and closing the valves associated to differently sized Laval tuyeres of the valve arrangement. For example, when using two Laval tuyeres of different inner cross-sections, three different gas flow rates can be selected (1 [1 open and 2 closed], 2 [2 open and 1 closed] or 1+2 [1 and 2 open]). When using three Laval tuyeres of different inner cross-sections, seven different gas flow rates can be selected (1, 2, 3, 1+2, 1+3, 2+3 or 1+2+3).

The source of pressurized gas may be any appropriate source with a gas suitable for the intended use, such as air, a process gas or even an inert gas if the bulk material may react in the presence of oxygen. In practice, the source may thus be a gas supply main, such as an inert gas or process gas supply, and/or it may be an intermediate buffer vessel arranged between said valve and (fed/filled by) the gas supply main.

In other words, a valve arrangement such as described herein may be provided directly between a gas supply main and the lock hopper, between a buffer vessel (itself fed by the gas supply main) and the lock hopper or if the apparatus provides for both types of connections, each may be provided with a valve arrangement. Each such valve arrangement may of course be configured differently and operated according to a different operating sequence.

Additionally or alternatively, a further line may be provided from the gas supply main to the one or more inlets of the lock hopper comprises a valve connected to a downstream Laval tuyere, which valve may be controlled to open within the operating sequence, preferably by the end of the pressurizing when the pressure inside the buffer vessel drops to lower pressures.

In a further aspect, the disclosure also considers the use of a valve arrangement comprising at least two valves arranged in parallel, each valve being connected to a downstream Laval tuyere, and of a control unit capable of controlling the opening of said valves in an operating sequence to provide pressurizing gas with an adjusted gas flow rate to a lock hopper in an apparatus for pressurizing bulk material in a hopper.

In particular, the disclosure concerns the above use for accelerated pressurizing bulk material in a hopper.

Alternatively, the use of an appropriately operated valve arrangement as described herein may be advantageously chosen for reducing noise nuisances and/or wear in pressurizing bulk material in a hopper, such as by starting the pressurizing operating sequence with a first valve associated to a Laval tuyere with a smaller inner cross-section.

Alternatively or additionally, the use as described herein may be chosen for reducing bulk material compacting during pressurizing bulk material in a hopper, such as by choosing a pressurizing operating sequence starting with a first valve associated to a Laval tuyere with a smaller inner cross-section.

In the context of the present disclosure if not otherwise specified, comparative or relative statements, such as "adjusted", "reduced", "shorten", "smaller", etc., are to be understood relative to an otherwise identical conventional process, apparatus, equipment or value, not having the features of the present disclosure. In particular, if not otherwise indicated, for the inner cross-section of the a Laval tuyere, the term "smaller" is to be understood as relative to the conventional inner cross-section of a Laval tuyere that would have been chosen by the engineer conceiving and sizing a conventional installation in order to have an appropriately high (or maximum admissible) mass flow rate for the intended use. In general, "a smaller inner cross-section" would refer to an inner cross-section representing 0.99 to 0.1 times, preferably 0.95 to 0.3 times, more preferably 0.90 to 0.5 times the inner cross-section it refers to, such as the conventional inner cross-section if not otherwise stipulated.

Alternatively or additionally, the use as described may be envisaged for (modifying and then) operating an existing/conventional apparatus for pressurizing bulk material in a hopper at higher pressure differential between pressurized gas source and unpressurized hopper without needing to re-dimension or replace parts of the apparatus, such as e.g. the injectors or sintered metal discs.

Alternatively or additionally, the use as described may be envisaged for operating an existing/conventional apparatus for pressurizing bulk material in a hopper at lower pressure differential between pressurized gas source and pressurized lock hopper without needing to re-dimension or replace major parts of the apparatus, such as e.g. the injectors or sintered metal discs.

In a still further aspect, the disclosure describes an apparatus for pressurizing bulk material in a hopper; the apparatus comprising a hopper configured as a lock hopper for containing a bulk material, a source of pressurized gas, lines configured to convey the pressurized gas from the source of pressurized gas to one or more inlets of the lock hopper. In particular the apparatus comprises a valve arrangement arranged in the line, wherein said valve arrangement comprises at least two valves arranged in parallel, each valve being connected to a downstream Laval tuyere. Furthermore, the apparatus is configured such that the opening of each of said valves is controllable by a control unit, the control unit being configured to control the opening of the valves in an operating sequence in order to provide pressurizing gas to the lock hopper.

Preferably, the opening and/or closing of the at least two valves of the valve arrangement in the operating sequence is controllable by said control unit based on the actual flow rate of the pressurizing gas measured downstream the valve arrangement using appropriate means, such as a gas volume flow rate or gas velocity measurement device. Alternatively or additionally, the opening and/or closing of the valves is controllable by said control unit based on the flow rate of the pressurizing gas calculated based on actual upstream and downstream pressures measured using pressure sensing device(s) during the pressurizing.

As already mentioned above in the context of the present process, in particularly preferred variants of the apparatus, the different Laval tuyeres in the valve arrangement have different inner cross-sections. In such cases, the operating sequence allows for even further adjusting the actual gas flow rate of the pressurizing gas by selectively opening and closing the valves associated to differently sized Laval tuyeres of the valve arrangement. For example, when using two Laval tuyeres of different inner cross-sections, three different gas flow rates can be selected (1, 2 or 1+2). When using three Laval tuyeres of different inner cross-sections, seven different gas flow rates can be selected (1, 2, 3, 1+2, 1+3, 2+3 or 1+2+3).

Alternatively or additionally, a further line may be provided from the gas supply main to the one or more inlets of the lock hopper comprises a valve connected to a downstream Laval tuyere, which valve may be controlled to open within the operating sequence, preferably by the end of the pressurizing when the pressure inside the buffer vessel drops to lower pressures.

As already mentioned above in the context of the present process, the source of pressurized gas may be a gas supply main and/or an intermediate buffer vessel arranged between the gas supply main and said valve.

BRIEF DESCRIPTION OF THE DRAWINGS

Preferred embodiments of the disclosure will now be described, by way of example, with reference to the accompanying drawing in which.

Further details and advantages of the present disclosure will be apparent from the following detailed description of several not limiting embodiments with reference to the attached drawing.

DESCRIPTION OF PREFERRED EMBODIMENTS

Figure 1:
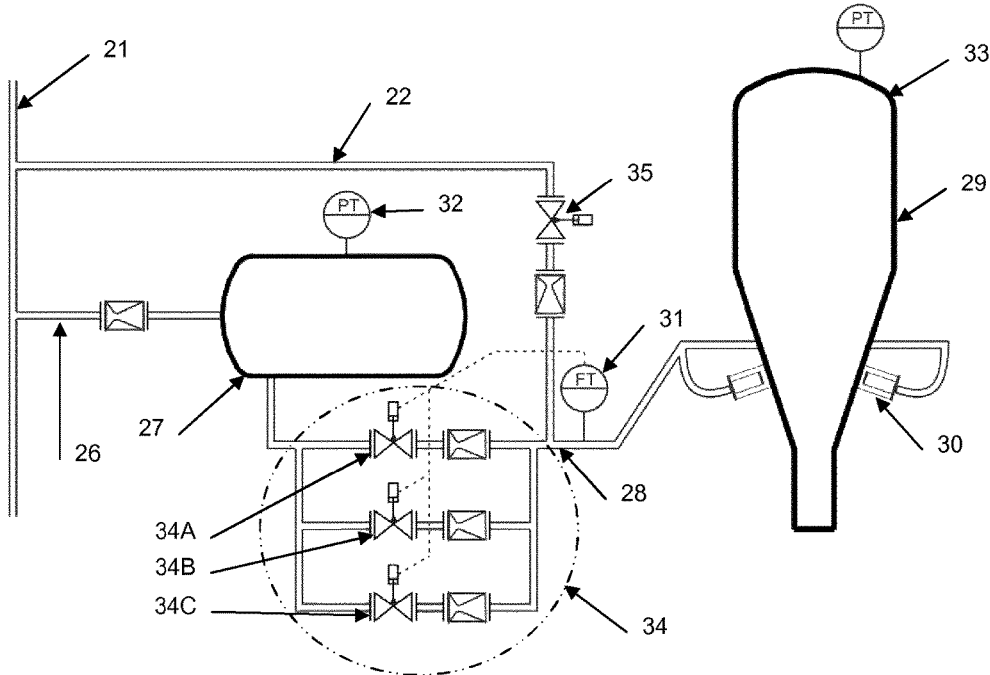
FIG. 1 is a schematic diagram of an embodiment of a preferred apparatus of the present disclosure or useable in a process of the present disclosure and FIG. 2 is a graph showing lock hopper pressure and gas volume flow rate as a function of time during lock hopper pressurizing.

With reference to FIG. 1, an apparatus for pressurizing bulk material in a hopper configured as a lock hopper 29 is provided for containing a bulk material, such as coal powder. A number of lines 22, 26, 28 are provided to convey the pressurized gas from the source (directly or via a buffer vessel) to one or more inlets 30 of the lock hopper 29. A valve arrangement 34 with valves 34A, 34B, 34C, as well as a valve 35 are arranged in the lines and their opening and closing may be controlled by a control unit (not represented separately). This control unit is programmed to control the opening and closing of the valves in an operating sequence in order to provide pressurizing gas to the lock hopper at an adjusted flow rate to the sintered metal discs 30 and the bulk material inside the lock hopper 29. It is important to note that in FIG. 1, additionally or alternatively, valve 35 could also be a valve arrangement in the sense of the present disclosure, such as that shown for valve 34.

The valves (preferably simple open/closed valves) may be operated in an operating sequence which is preset based on the dimensions of the apparatus and the known pressures of the main supply/buffer vessel and of the lock hopper. Preferably however, the gas volume flow rate is controlled by an operating sequence which takes into account actual parameters during the pressurizing cycle. This may be done by different means or ways.

A volume flow rate (or velocity) measurement 31 is installed in the pressurizing gas pipeline connecting the buffer vessel 27 to the lock hopper 29. The control unit acts on the valves 34A, 34B, 34C to open a (further or a different) valve if the actual volume flow rate value measured in the measurement 31 drops too far below a preset value.

Alternatively or additionally, the characteristics of the valves 34A, 34B, 34C, with their associated Laval tuyere, e.g. the mass flow rate produced by the valve depending on the pressure level measured upstream 32, the pressure level measured downstream 33 and the open or closed position of the at least two valves, are included into the controller. The actual mass flow rate value, conditioned by the pressure level measured in 32 and/or 33, is continuously computed. The controller actuates the valves accordingly (by opening further valve or by opening valve with larger associated Laval tuyere and optionally closing the previously open smaller sized line), in such a way as to produce a sequentially increasing mass flow rate, the set point value for the valve position resulting from the pressure levels upstream 32 and downstream 33 and the mass flow rate value.

The pressurizing gas volume flow rate directly supplied from the process gas supply main 21 may be controlled using valve 35, the pressure upstream now being the pressure level in that process gas supply main.

As an illustration of the achievements of the present disclosure, the following calculation can be made: $p_1$ being the initial (absolute) pressure level in the lock hopper, $p_2$ the final (absolute) pressure level in the lock hopper, and pressurizing being performed either with constant mass flow rate (by means of a Laval tuyere with constant upstream pressure level), with a volume flow rate adjusted by means of a valve arrangement controlled as described herein or with constant volume flow rate. A corresponding illustrative example is also depicted in the graph of FIG. 2 (see below).

The maximum actual gas velocity in case of constant mass flow rate pressurizing equaling the actual constant gas velocity in case of constant volume flow rate pressurizing, the ratio of pressurizing time durations of constant volume flow rate pressurizing versus constant mass flow rate pressurizing equals $\ln(p_2/p_1)/[(p_2-p_1)/p_a]$, $p_a$ being the (absolute) atmospheric pressure, ln being the natural logarithm. Example: $p_1$=0 bar g=1 bar a, $p_2$=9 bar g=10 bar a, $p_a$=0 bar g=1 bar a. The ratio of pressurizing time durations becomes $\ln(p_2/p_1)/[(p_2-p_1)/p_a]$=0.256, i.e. the pressurizing time duration would be reduced by up to about 74%.

Figure 2:
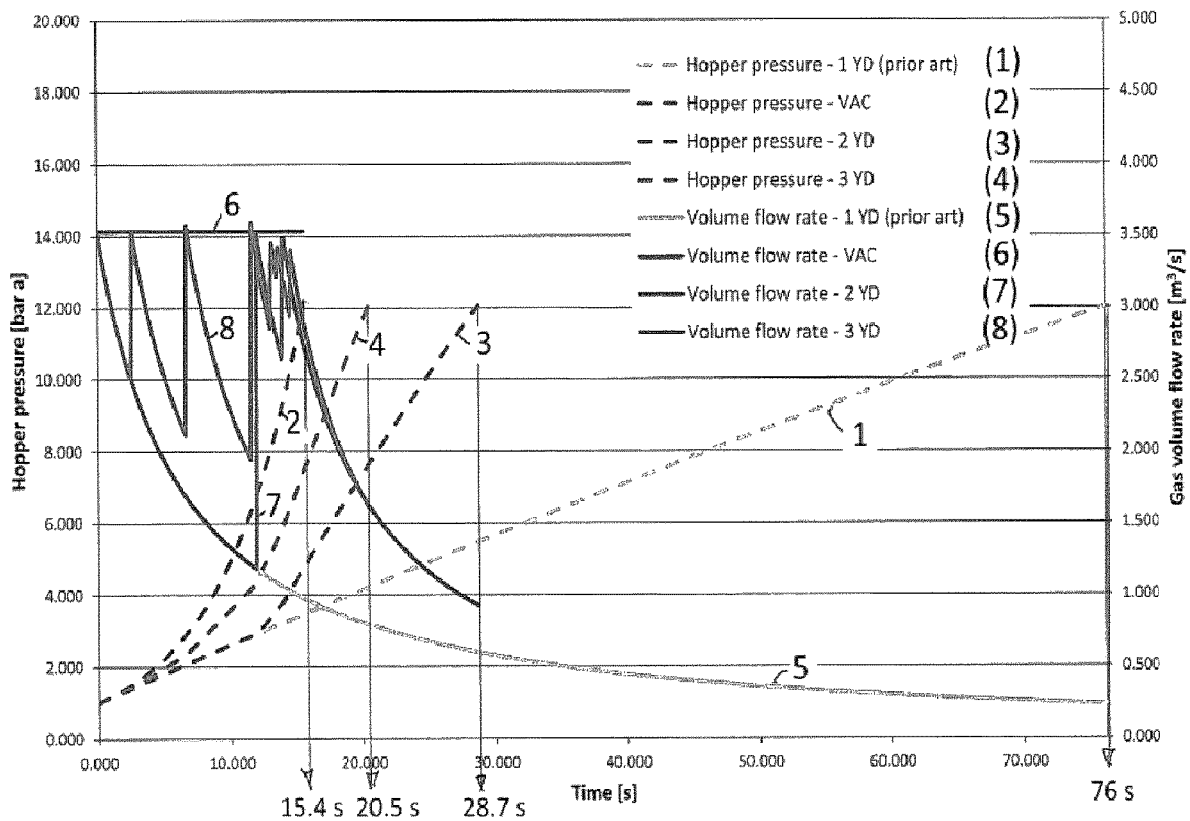

FIG. 2 graphically shows the results in terms of hopper pressure and gas volume flow rate as a function of time for a valve arrangement with two valves (2YD), curves (3) and (7) and for a valve arrangement with three valves (3YD), curves (4) and (8), compared to a conventional one valve+Laval tuyere configuration (1YD), curves (1) and (5). All shown variants are based on the following assumptions: pressurizing gas vessel of 65 m³ useful volume and an initial pressure of 17 bar a; lock hopper to be pressurized having an available gas volume of 22 m³ and a final pressure of 12 bar a, maximum gas volume flow rate of 3.54 m³/s to be respected. As can be seen in FIG. 2, even when using two or three Laval tuyeres instead of one, the pressurizing time can already be significantly reduced (from 76 s to only 28.7 s or even only 20.5 s) while respecting the same maximum gas flow rate (i.e. gas velocity).

Although the pressurizing duration may be reduced to a lesser extent using a valve arrangement as described herein compared to a constant volume flow rate assumption (indicated VAC in FIG. 2, curves (2) and (6)), the reduction is nevertheless hugely significant and surprising, all the more so because these reductions are achieved using technically simple, robust and known components (on/off valves and Laval tuyeres) with a relatively simple control unit.

The present disclosure is not restricted to embodiments and to specific applications relating to injecting coal into a blast furnace. It may also be applied to other installations comprising pressurized hoppers containing powder materials and requiring periodic pressurization of said hoppers.

The invention claimed is:

1. A process for pressurizing bulk material in an apparatus for pressurizing bulk material in a hopper; wherein the hopper is configured as a lock hopper containing a bulk material, wherein the apparatus comprises a source of pressurized gas, lines to convey the pressurized gas from the source of pressurized gas to one or more inlets of the lock hopper, a valve arrangement arranged in the lines, wherein said valve arrangement comprises at least two valves arranged in parallel, each valve being connected to a downstream Laval tuyere, said method comprising:
controlling said valves to open in an operating sequence to provide pressurizing gas with an adjusted gas flow rate to the lock hopper;
wherein the opening of the at least two valves in the operating sequence is controlled based on an actual gas flow rate of the pressurizing gas measured downstream the valve arrangement using a volume flow rate or velocity measurement device and/or on a gas flow rate of the pressurizing gas calculated based on actual upstream and downstream pressures measured using a pressure sensing device during the pressurizing; and
wherein the Laval tuyeres in the valve arrangement have different inner cross-sections and wherein the operating sequence comprises opening and closing the valves of the valve arrangement allowing for further adjusting the actual gas flow rate of the pressurizing gas.

2. The process as claimed in claim 1, wherein the source of pressurized gas is a gas supply main and/or an intermediate buffer vessel arranged between the gas supply main and said valve arrangement.

3. The process as claimed in claim 2, wherein a further line from the gas supply main to the one or more inlets of the lock hopper comprises a valve connected to a downstream Laval tuyere, which valve is controlled to open within the operating sequence by an end of the pressurizing.

4. An apparatus for pressurizing bulk material in a hopper, comprising:
a hopper configured as a lock hopper containing a bulk material,
a source of pressurized gas,
lines configured to convey the pressurized gas from a source of pressurized gas to one or more inlets of the lock hopper,
a valve arrangement arranged in the lines,
wherein the valve arrangement comprises at least two valves arranged in parallel, each valve being connected to a downstream Laval tuyere,
wherein the opening of each of said valves is controllable by a control unit,
wherein the control unit is configured to control the opening of the valves in an operating sequence in order to provide pressurizing gas with an adjusted gas flow rate to the lock hopper;
wherein the opening of the at least two valves of the valve arrangement in the operating sequence is controllable by said control unit based on an actual flow rate of the pressurizing gas measured downstream the valve arrangement using a volume flow rate or velocity measurement device and/or on a volume flow rate of the pressurizing gas calculated based on actual upstream and downstream pressures measured using a pressure sensing device during the pressurizing; and
wherein the Laval tuyeres in the valve arrangement have different inner cross-sections and wherein the operating sequence is controllable to allow for independently opening and closing the valves of the valve arrangement to adjust the actual gas flow rate of the pressurizing gas.

5. The apparatus as claimed in claim 4, wherein the source of pressurized gas is a gas supply main and/or an intermediate buffer vessel arranged between the gas supply main and said valve arrangement.

6. The apparatus as claimed in claim 4, wherein a line from the gas supply main to the one or more inlets of the lock hopper comprises a valve connected to a downstream Laval tuyere, which valve is controllable by the control unit to be opened within the operating sequence by the end of the pressurizing.

* * * * *